Jan. 28, 1941.　　　　G. A. MOORE　　　　2,229,864
METHOD AND MEANS FOR MAKING CONTAINERS
Filed Nov. 6, 1937　　　　12 Sheets-Sheet 2
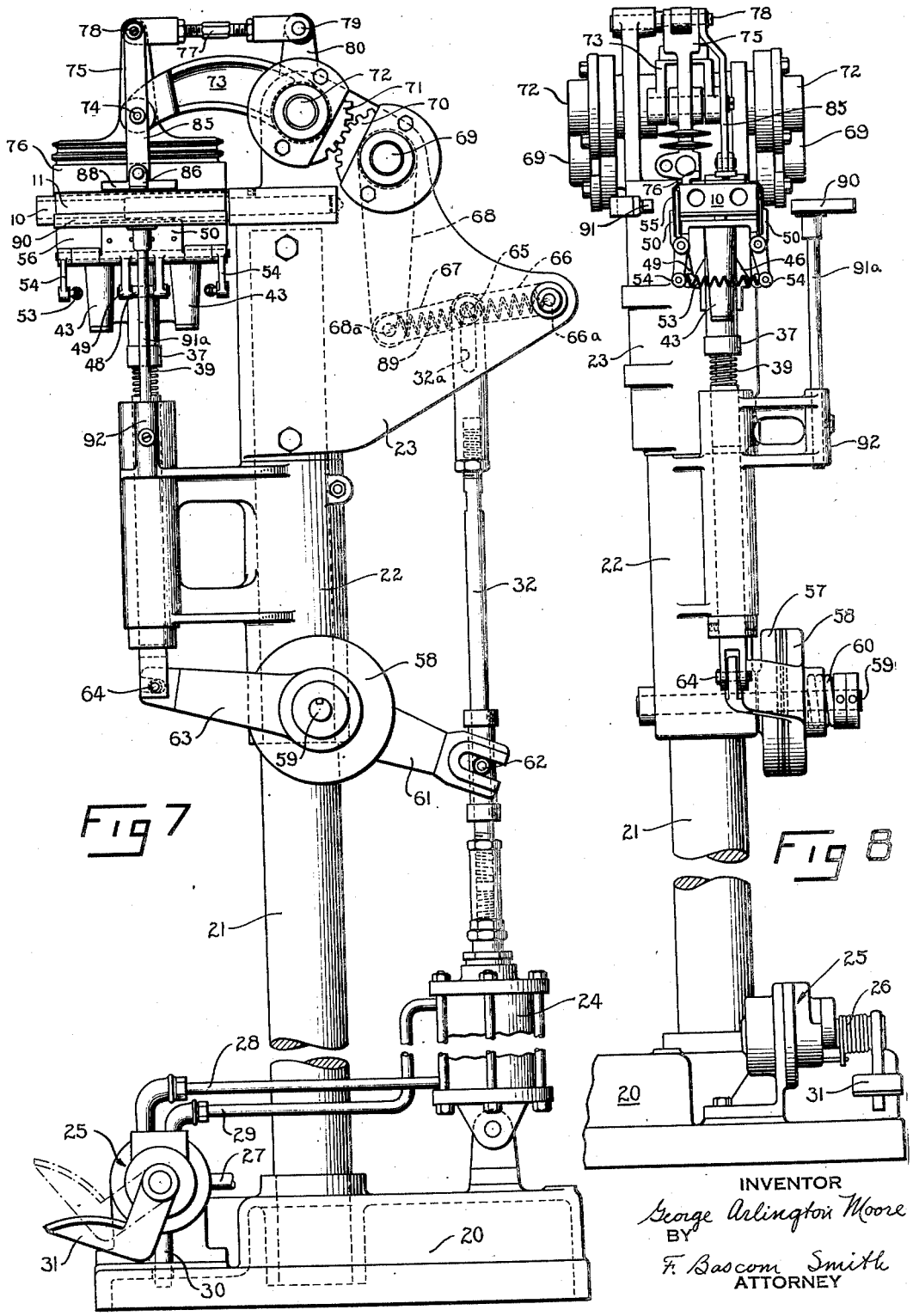
INVENTOR
George Arlington Moore
BY
F. Bascom Smith
ATTORNEY Jan. 28, 1941.  G. A. MOORE  2,229,864
METHOD AND MEANS FOR MAKING CONTAINERS
Filed Nov. 6, 1937    12 Sheets-Sheet 3
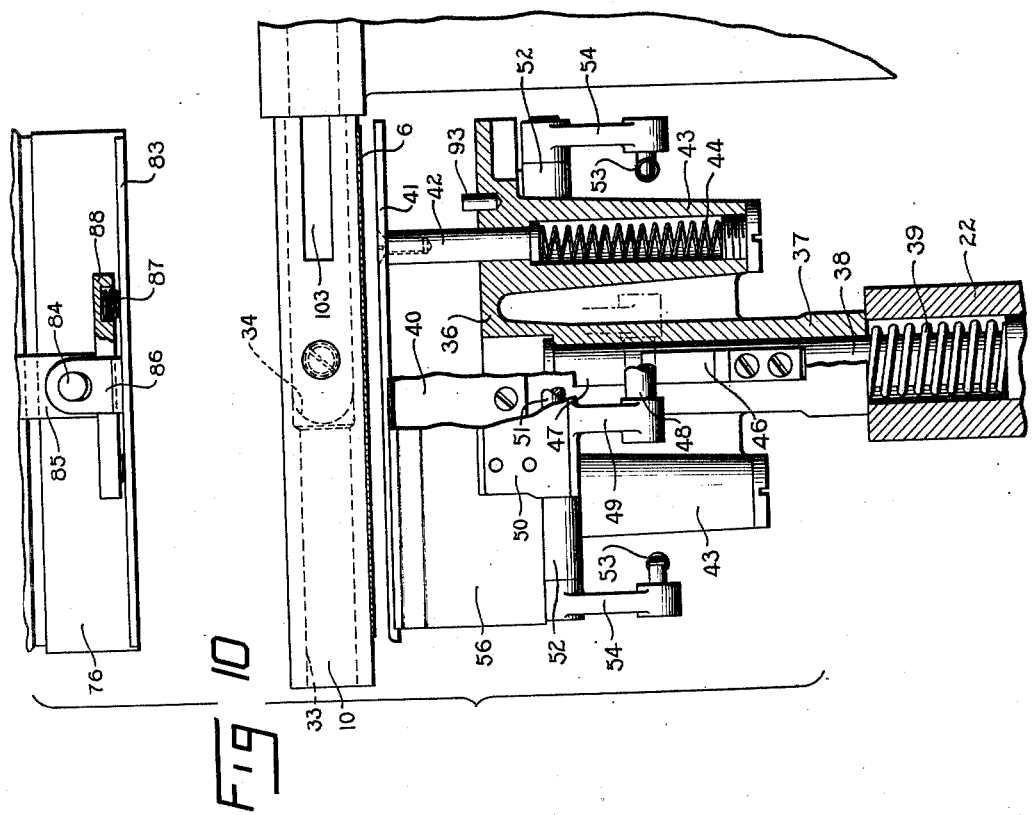
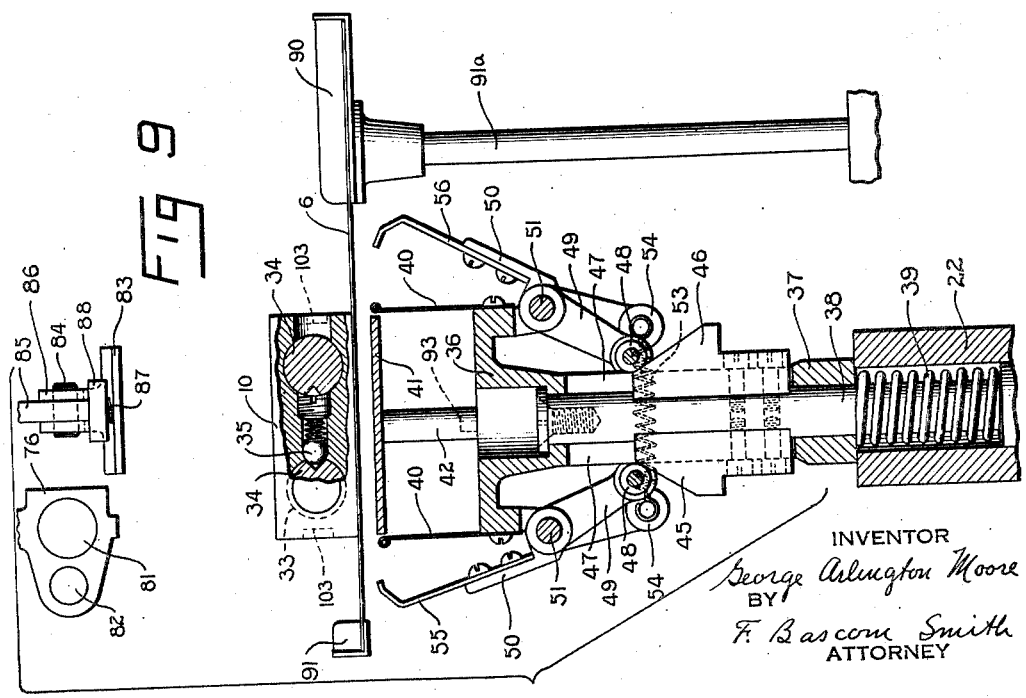
INVENTOR
George Arlington Moore
BY
F. Bascom Smith
ATTORNEY

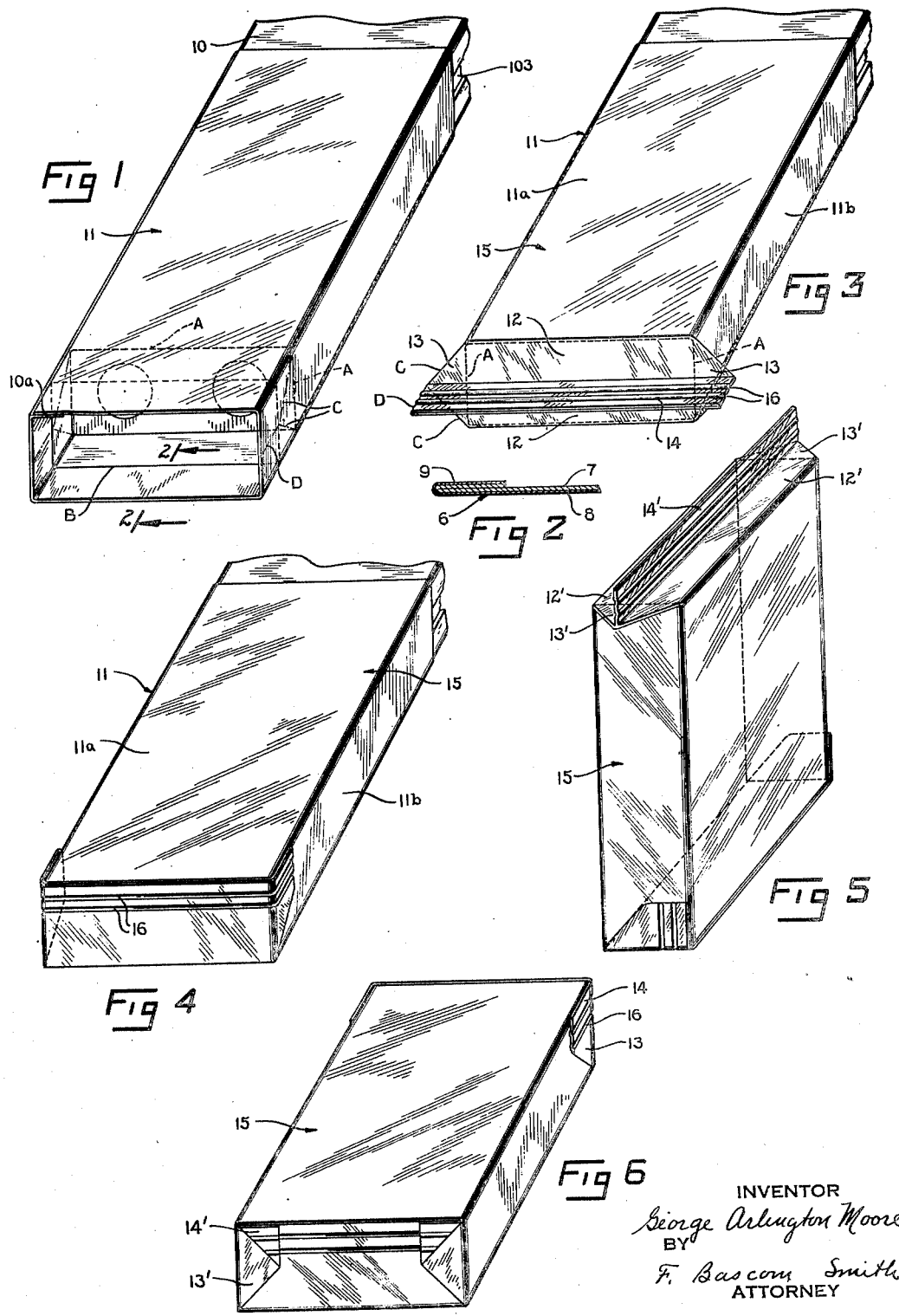

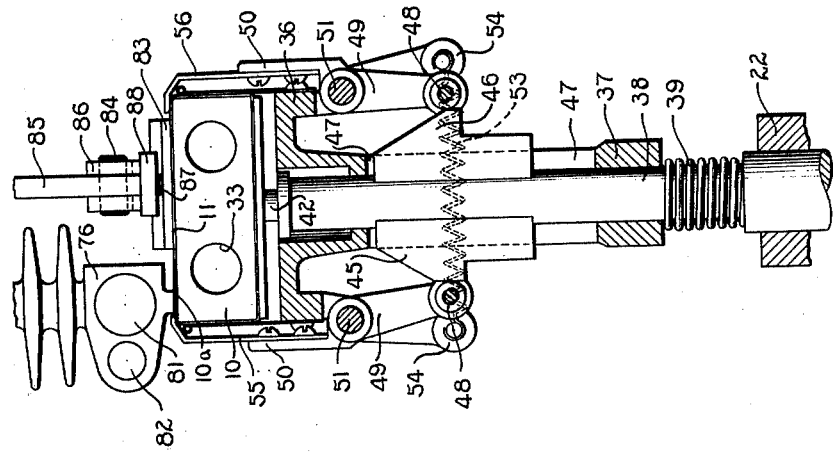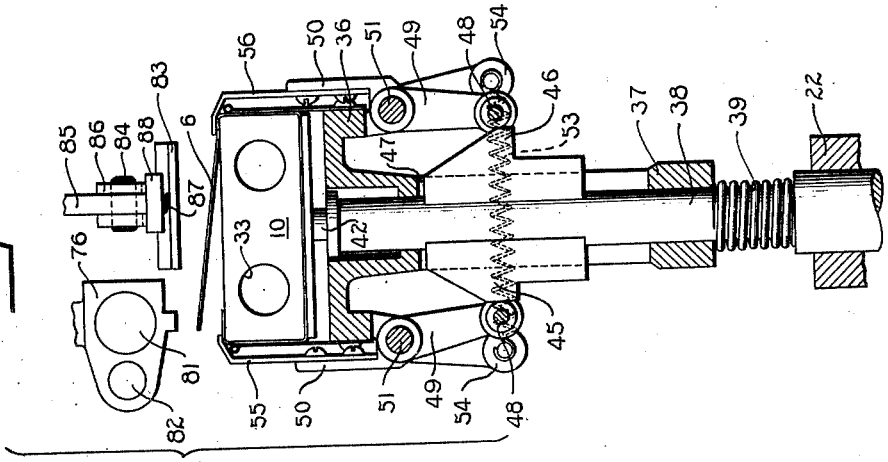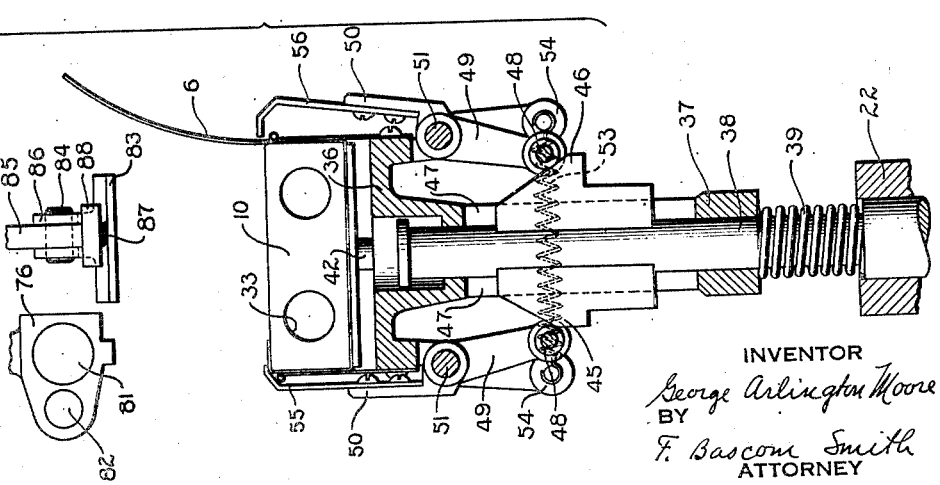

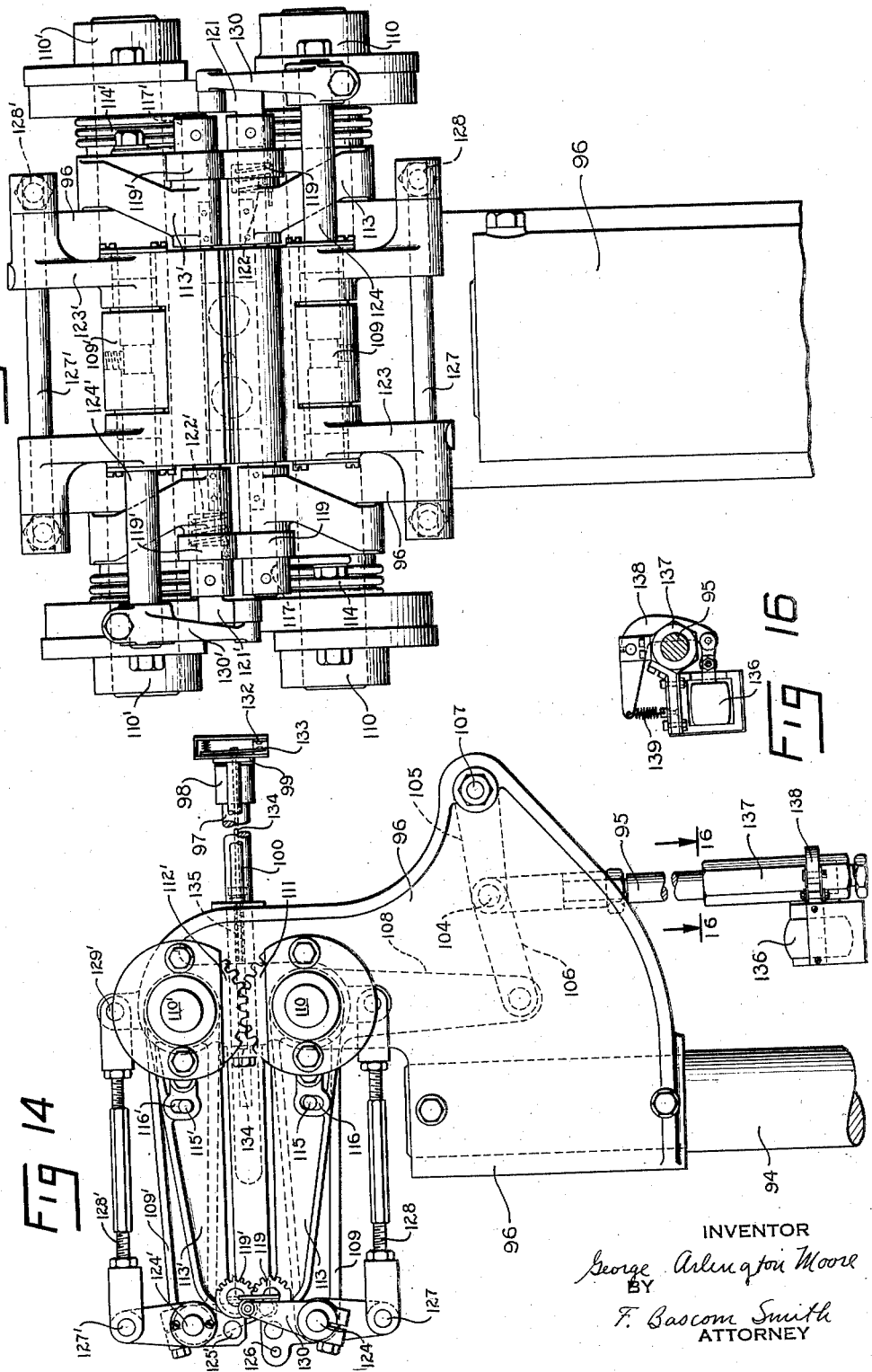

Jan. 28, 1941. G. A. MOORE 2,229,864
METHOD AND MEANS FOR MAKING CONTAINERS
Filed Nov. 6, 1937 12 Sheets-Sheet 6

INVENTOR
George Arlington Moore
BY
F. Bascom Smith
ATTORNEY

Jan. 28, 1941.                 G. A. MOORE                    2,229,864
                    METHOD AND MEANS FOR MAKING CONTAINERS
                    Filed Nov. 6, 1937           12 Sheets-Sheet 7
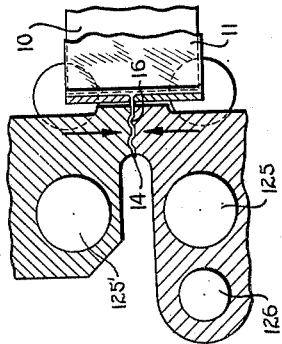
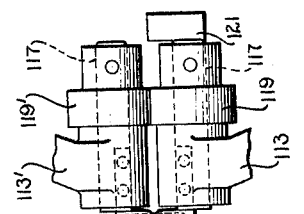
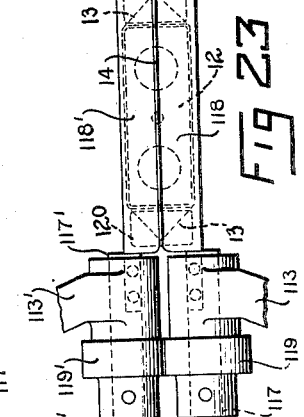
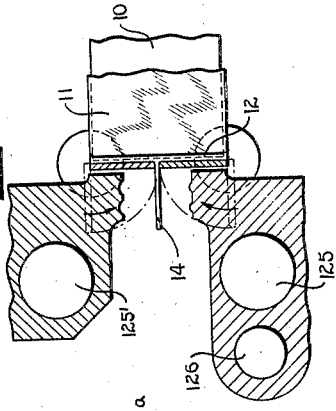
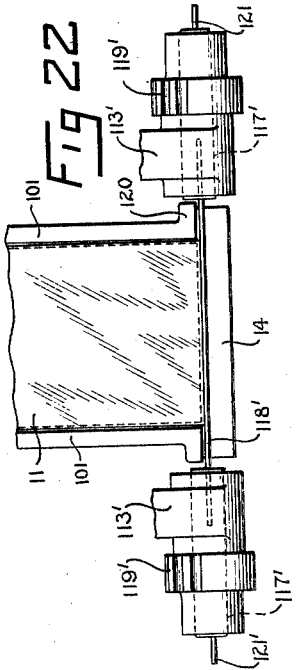
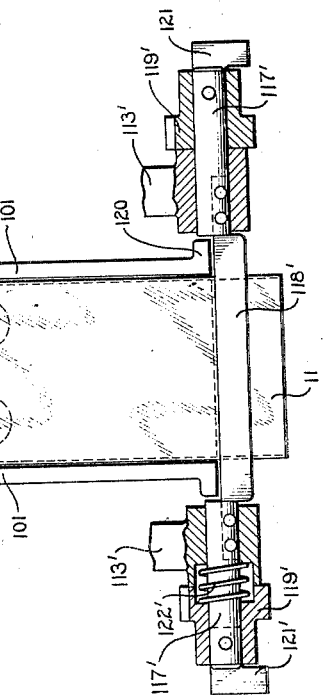
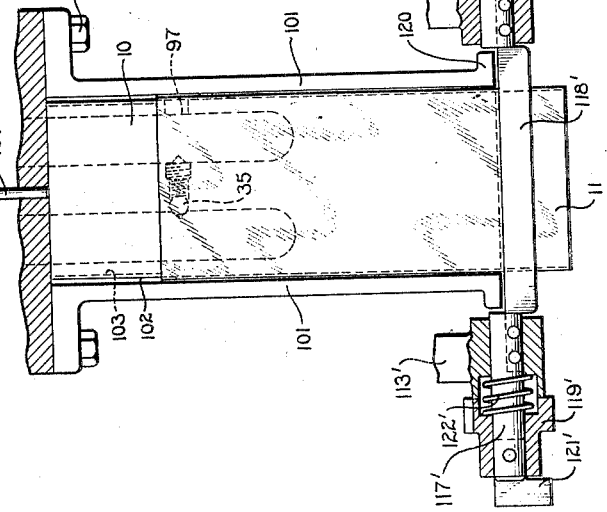
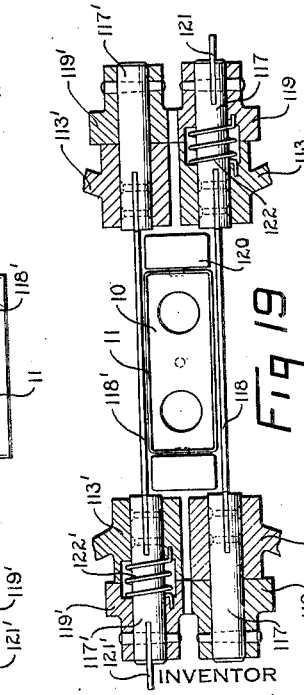
INVENTOR
George Arlington Moore
BY
F. Bascom Smith
ATTORNEY Jan. 28, 1941.　　　G. A. MOORE　　　2,229,864
METHOD AND MEANS FOR MAKING CONTAINERS
Filed Nov. 6, 1937　　12 Sheets-Sheet 8
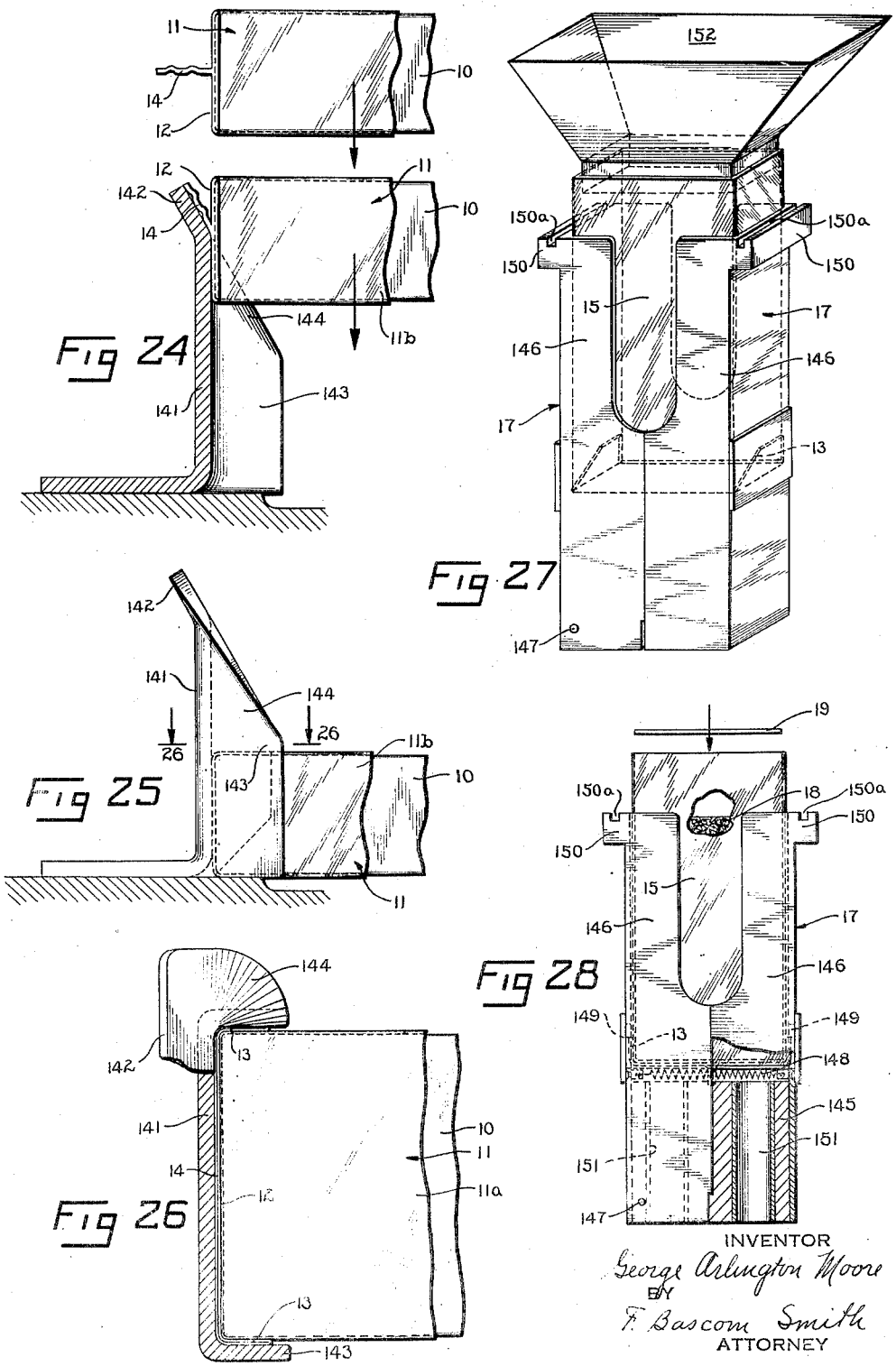
INVENTOR
George Arlington Moore
BY
F. Bascom Smith
ATTORNEY

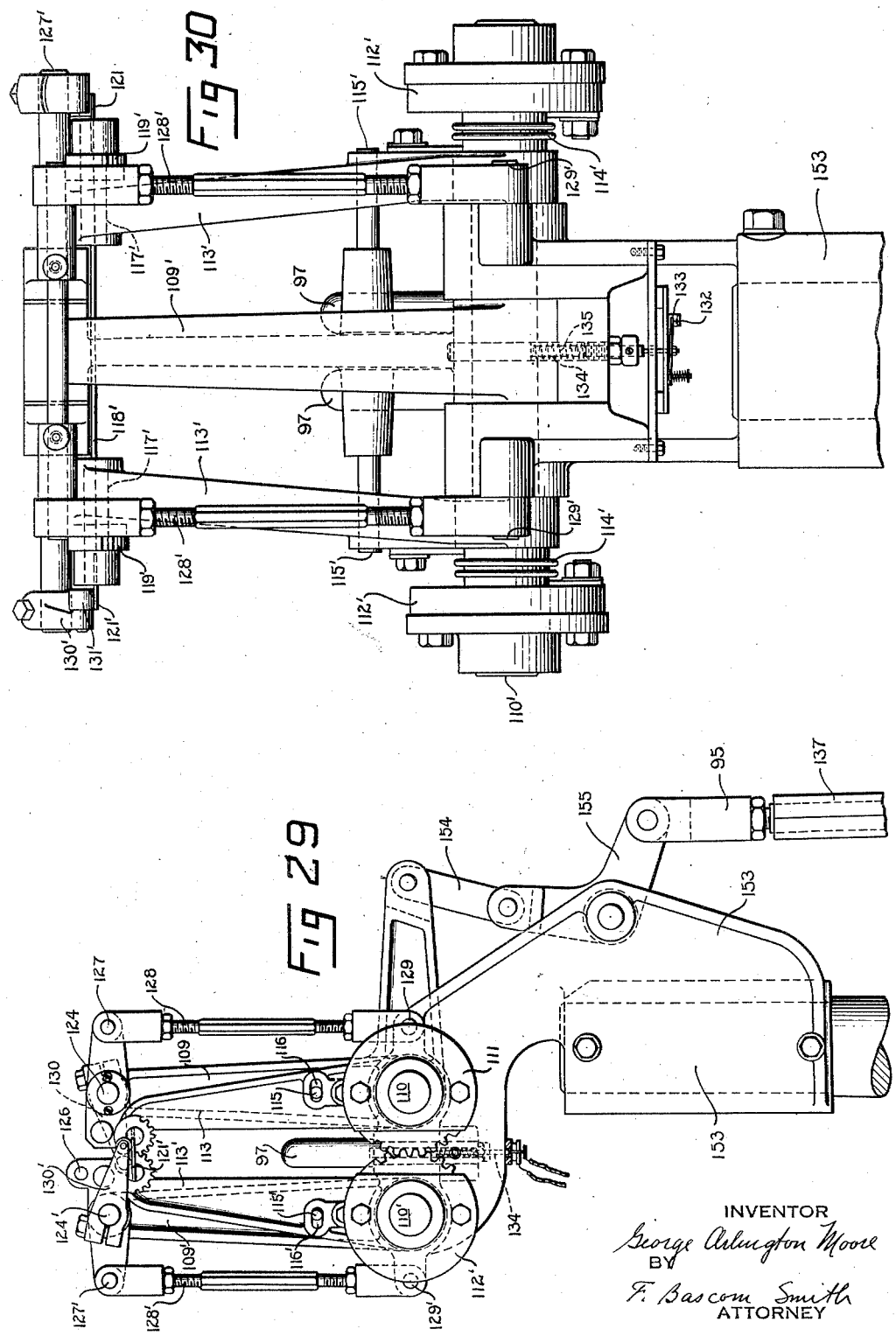

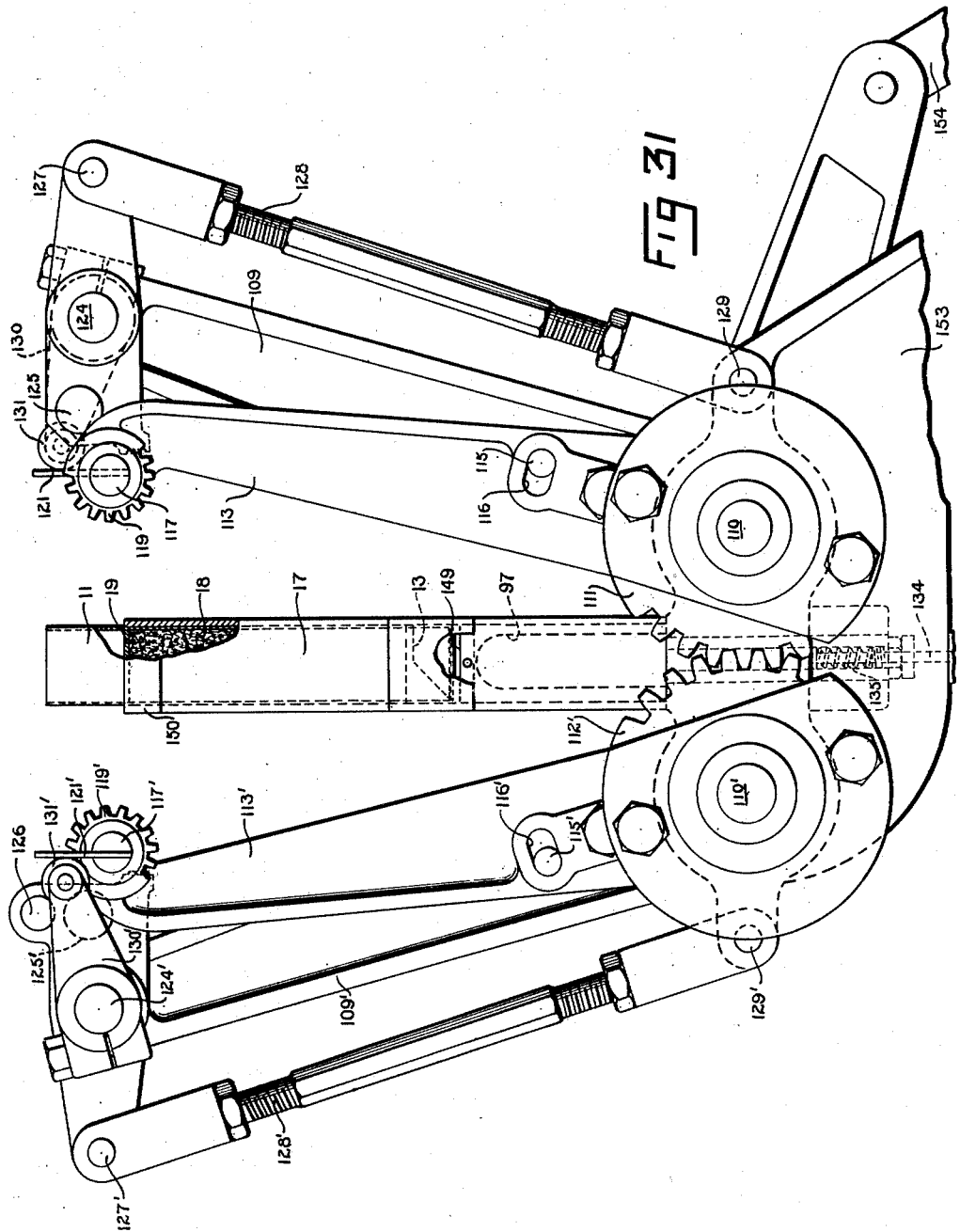

Jan. 28, 1941.  G. A. MOORE  2,229,864
METHOD AND MEANS FOR MAKING CONTAINERS
Filed Nov. 6, 1937   12 Sheets-Sheet 11

INVENTOR
George Arlington Moore
BY
F. Bascom Smith
ATTORNEY

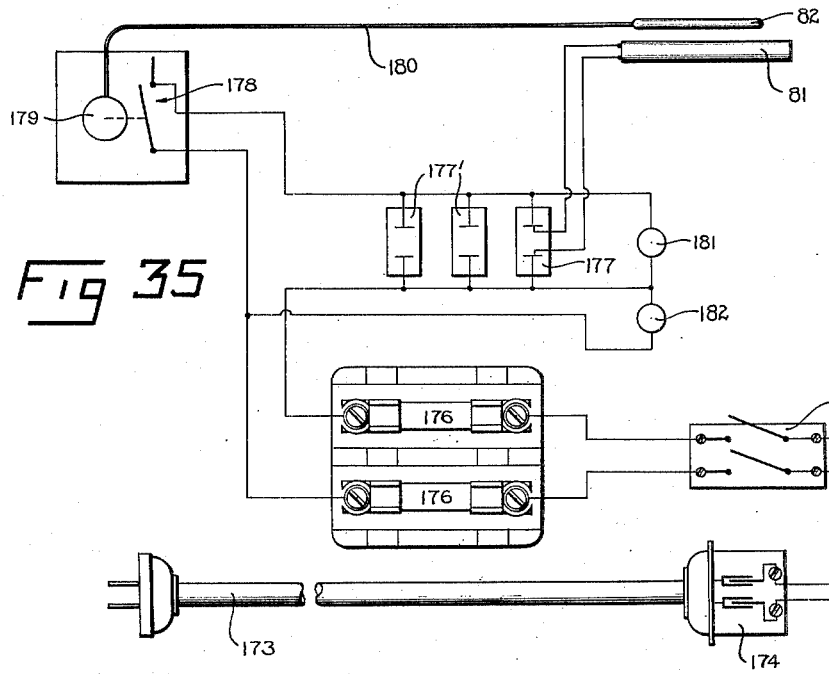
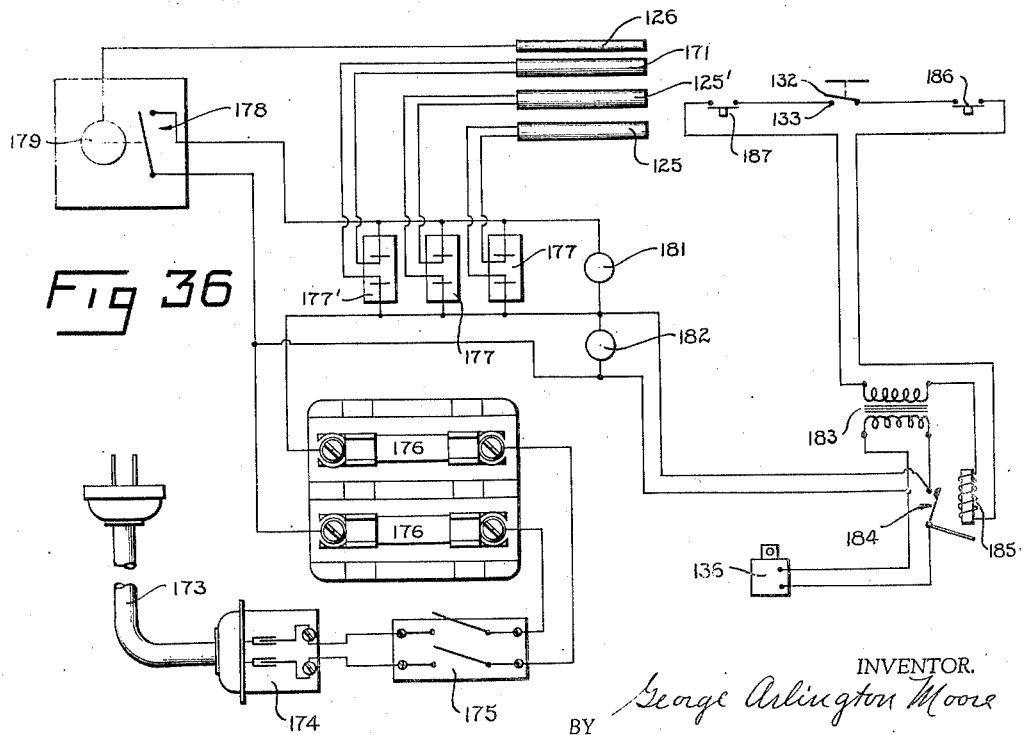

Patented Jan. 28, 1941

2,229,864

UNITED STATES PATENT OFFICE 2,229,864

METHOD AND MEANS FOR MAKING CONTAINERS

George Arlington Moore, Louisville, Ky., assignor to Humoco Corporation, Louisville, Ky., a corporation of Delaware Application November 6, 1937, Serial No. 173,101

17 Claims.  (Cl. 93—3)

This invention relates to containers and more particularly to methods and means for making containers from foldable materials, such as paper and metallic foil, for example.

One of the objects of the present invention is to provide a novel method for making containers from blanks comprising fibrous materials which are substantially impervious to air and moisture.

Another object of the invention is to provide a novel method of making containers whereby the same may be quickly and inexpensively made and filled in large quantities with the aid of high-speed machinery.

Still another object is to provide novel power-operated apparatus which may be employed in carrying out the novel method of the invention.

A further object is to provide novel means for folding and sealing the ends of an open-ended container to thereby form an hermetic end closure.

A still further object is to provide novel means for making open-ended container bodies or the like from blanks of foldable materials, such as paper, foil and the like.

Another object is to provide novel apparatus whereby foldable portions projecting from the walls of containers or container bodies may be readily folded down against said walls.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference being had for this latter purpose to the appended claims.

In the drawings, wherein like reference characters refer to like parts throughout the several views, Fig. 1 is an isometric view, with parts broken away, showing a container body formed in accordance with the novel method of the invention, said body being shown on a mandrel which constitutes a part of the novel apparatus provided for carrying out said method;

Fig. 2 is a detail sectional view taken on line 2—2 of Fig. 1 and showing a portion of a preferred form of blank employed in making said body;

Fig. 3 is a view similar to Fig. 1 showing one end of the body folded and sealed in a novel manner;

Fig. 4 shows the sealed portions of the container folded flat against the walls thereof;

Fig. 5 shows the container after the sealing of the second end thereof;

Fig. 6 illustrates the completed container;

Fig. 7 is a side elevation, with parts broken away, of one form of the novel body making machine employed in making the body of Fig. 1 in accordance with the novel method of the invention;

Fig. 8 is a similar front elevation of said body-making machine;

Fig. 9 is an enlarged detail front view, partly in section and with parts broken away, of a portion of said machine in open position for receiving a blank;

Fig. 10 is a similar side elevation of said portion in the same position;

Figs. 11, 12 and 13 are views similar to Fig. 9 and show the folding and sealing mechanisms of the body-making machine in successive positions during the body forming movement thereof;

Fig. 14 is a side elevation view, with parts broken away, of one form of novel end forming apparatus for folding and sealing one end of the container;

Fig. 15 is a similar front elevation of said apparatus on a slightly enlarged scale;

Fig. 16 is a detail top view, partly in section, of a portion of the safety mechanism of said apparatus, the view being taken on line 16—16 of Fig. 14;

Fig. 18 is a detail plan view of said apparatus, partly in section and with parts broken away, showing the end folding blades in the positions assumed thereby at the beginning of the folding operation;

Fig. 19 is a sectional front elevation of the details shown in Fig. 18;

Fig. 20 is a detail sectional view of a portion of the folding mechanism of said apparatus showing the folding blades after forming the end wall and closure tab, and showing the sealing irons moving into position to engage the tab;

Fig. 21 is a similar view showing the sealing irons in operative position;

Fig. 22 is a view similar to Fig. 18 but showing the end folding blades at the end of the folding operation;

Fig. 23 is a front elevation view of the detail parts of Fig. 22 in the same position;

Fig. 24 is a sectional side elevation, with parts broken away, of apparatus for folding the tabs formed during the end folding operation and showing a container at the beginning of its movement into said apparatus;

Fig. 25 is a side elevation of said apparatus with a container shown at the end of its tab folding movement;

Fig. 26 is a top plan view of said apparatus, partly in section and partly broken away, the section being taken on line 26—26 of Fig. 25;

Fig. 27 is an isometric view of a partially closed container supported by a chuck for filling;

Fig. 28 is a side elevation view of the same after the filling operation, a portion being shown in section and a portion being broken away;

Fig. 29 is a partial side elevation of novel apparatus for closing and sealing the other end of the container, the folding and sealing mechanisms thereof being shown in closed or operative position;

Fig. 30 is a front elevation view of said apparatus, i. e., viewed from the left as seen in Fig. 29 on a slightly enlarged scale;

Fig. 31 is an enlarged side elevation of the folding and sealing mechanisms of said apparatus in open position for receiving a filled container and its supporting chuck;

Fig. 35 is a wiring diagram for the electrical heating element employed in the body making machine of Fig. 7; and, Fig. 36 is a wiring diagram for the electrical heating elements and safety means embodied in the end forming and sealing machines of Figs. 14 and 29.

Figure 17:
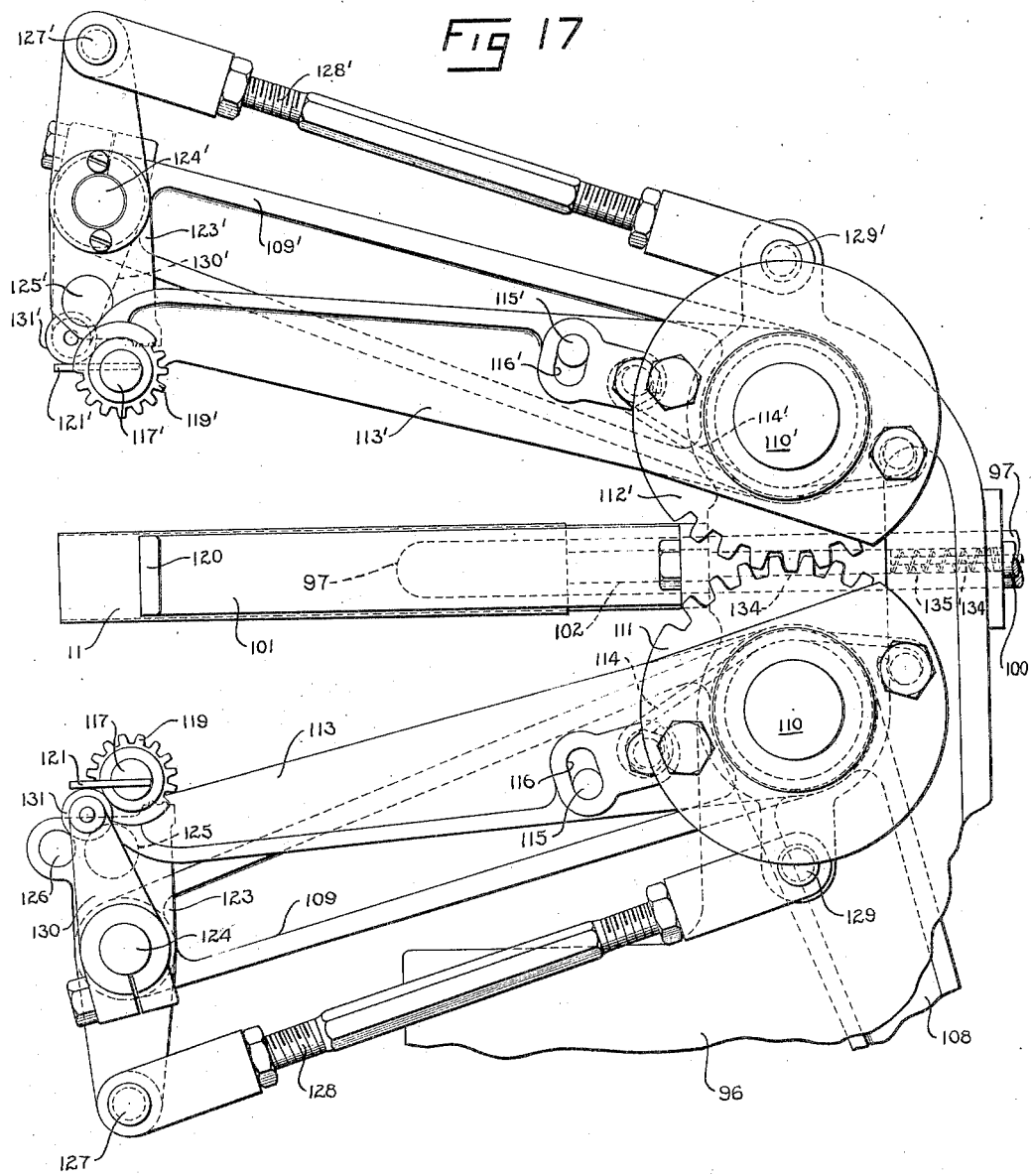
Fig. 17 is an enlarged detail view of a portion of said apparatus with the jaws thereof in open position for receiving a container body and supporting mandrel.

One form of container which may be constructed by employing the novel apparatus comprehended by the invention in carrying out the novel method hereinafter described is illustrated, by way of example, in Figs. 1 to 6, inclusive, of the accompanying drawings in the form of an impervious container comprising fibrous material, said container being suitable for packaging a large number of products, particularly those of a hygroscopic nature, such as tobacco. The embodiment illustrated is made from an impervious rectangular blank 6 (only partly shown in section, Fig. 2) which preferably comprises an inner paper lamina 7 and an outer lamina 8 of non-hygroscopic material, such as metallic foil, said laminae being secured together with an elastic adhesive. As shown, foil layer 8 constitutes the external surface of the blank or container made therefrom and is coated with a thin, dry film of thermoplastic lacquer or the like having adhesive and moisture-proof properties. Du Pont's lacquer No. X–660–208 may be employed for this purpose, the same serving as a binding medium whereby the container may be imperviously sealed against the entrance or escape of air or moisture in a manner which will hereinafter appear. Preferably, the marginal portions of two opposed edges of blank 6 are folded inwardly, as best seen in Figs. 1 and 2, for forming reinforced margins or hems 9 and providing means for obtaining metal-to-metal closure seams in the container made from the blank 6 when the same is folded and sealed in accordance with the novel method hereinafter described. Said infolded margins may be adhesively secured in folded position either prior to or during the fabrication of the container from the blank and, if desired, a part of all of the outer surface of paper lamina 7 may be coated with a thin, dry film of lacquer, such as Du Pont's lacquer No. 603–208, for further insuring the moisture-proof qualities of the container and serving as a thermoplastic adhesive for securing said infolded margins in folded position. In addition to the above, any or all of the raw edges of blank 7, 8 may be impregnated with paraffin wax or the like to prevent the wicking of moisture by the paper component 7.

In practicing the novel method of the invention, blank 6 is first wrapped around a mandrel or arbor 10 by means of the operation of a novel body-making machine (Fig. 7) so that the opposed edges of said blank overlap in the manner best seen in Fig. 1. The overlapping edges are heat-sealed by said machine along a seam 10a extending longitudinally of mandrel 10 thereby forming an open-ended body 11 of rectangular cross-section having reinforced edges 9 extending around the peripheries of the open ends thereof. Seam 10a may be formed at any point about the periphery of body 11 but is preferably near one corner thereof in order that the sealing iron will not deface printed matter which may be provided on the outer surface of lamina 8.

After the formation of body 11, the same is removed, together with mandrel 10, from the body-making machine and transferred to a novel top-forming and -sealing machine (Fig. 14). While inserting the mandrel supported body in the top sealer, the body is caused to slide longitudinally of the mandrel to the position illustrated in Fig. 1, i. e., to a position such that a marginal portion of the body 11 overhangs the outer end of mandrel 10. The width of the overhanging marginal portion measured in the direction of the longitudinal axis of body 11 is preferably substantially equal to one-half the width of said body plus the length of reinforced margin 9. While body 11 is thus supported in the top-forming machine, said overhanging marginal portion is folded, by novel means and in a novel manner to appear hereinafter, along lines A to D, inclusive, to thereby form a two-part end wall 12, 12 (Fig. 3), a pair of laminated triangular tabs or ears 13, and a tab 14 extending across the end of the container at the center thereof and terminating at the extreme vertices of said triangular tabs. End walls 12, 12 are constituted by infolded portions of side walls 11a of the body, tabs 13, 13 are formed by simultaneously folding portions of side walls 11b outwardly along line A and inwardly along lines C, and tab 14 is formed by folding sides 11b along lines D to thereby bring opposed halves of the inner peripheral, foil-faced surface of reinforced margin 9 into engagement.

While the above-described folded portions are positively held in folded position by the folding means, a pair of heated sealing irons constituting a part of the folding and sealing machine move into engagement with opposed faces of tab 14 and apply sufficient heat and pressure thereto to activate the dry lacquer film on the engaging inner surfaces of opposed halves of hem 9 and press the same into the interstices of said surfaces. The latter are thus quickly and efficiently welded together to form an hermetic metal-to-metal seal or seam closing what will be referred to as the top or upper end of the container 15. The sealing irons are preferably provided with one or more sets of cooperating ribs and grooves whereby tab 14, which is constituted by hem 9 is embossed along lines 16 for further insuring an hermetic seal, particularly at the edge of seam 10a. In order to facilitate opening of the package by the consumer, the sealed portion of tab 14 preferably does not extend to the extreme outer edge thereof. The consumer is thus enabled to initiate the separation of the opposed halves of tab 14 easily and without danger of tearing the material from which the container is made. A firm digital grip may then be obtained on said opposed halves for separating the sealed portions thereof and hence for opening the container to dispense the contents therefrom.

After one end of body 11 is thus sealed, said body, while still supported on mandrel 10, is removed from the top-sealing machine and inserted in a novelly constructed plow (Figs. 24 to 26) wherein, by a single linear movement of said body and mandrel, tab 14 is folded flat against end wall 12, and the projecting ends of said tab, together with ears 13 are folded down against side walls 11b (Fig. 4). If desired, said ears may be adhesively tacked against walls 11b or the same may be effectively held in folded position by any other suitable means, such as the internal revenue stamp required on packaged tobacco.

Container 15, having one end thereof completed, is now removed from mandrel 10 and inserted in a chuck 17 (Figs. 27 and 28). The container is then filled through the open end thereof with a measured quantity of tobacco 18 or other product to be packaged and a stiff secondary closure or packing strip 19 of newsboard or the like (Fig. 28), having an area substantially equal to the inner cross-sectional area of the container is inserted against the tobacco and pressure exerted thereagainst by a suitable plunger (not shown) for packing the tobacco. Strip 19 is preferably inserted to such an extent that, after withdrawal of the packing plunger, it will assume a position in the plane of the outer end of supporting chuck 17 (Fig. 31).

The filled container, together with portable chuck 17 in which it is supported, is transferred to a novel bottom-folding and sealing machine whereby the bottom end of the container through which the same was filled is closed and sealed in the same manner in which the top was sealed, i. e., by forming a two-part end wall 12', 12', laterally extending ears 13', 13', and sealed tab 14' (Fig. 5) all by the operation of angularly moving folding members or blades and converging sealing irons to be hereinafter fully described. During this latter folding and sealing operation, strip 19 serves as an internal support for maintaining the desired outline or shape at the bottom end of the container.

After being completed to the stage illustrated in Fig. 5, container 15, together with chuck 17, is removed from the bottom-sealing machine and transferred to a plow and tacking mechanism (Figs. 32 and 33) wherein by a single linear movement of the chuck-supported container, tab 14' is folded flat against end wall 12', and ears 13', 13', together with the projecting ends of tab 14', are folded inwardly against the bottom of the container and heat-sealed in position, thereby completing the hermetically sealed container, as seen in Fig. 6.

*Body-making*

As pointed out in the foregoing general description of the novel method for making, filling and hermetically sealing container 15, the first steps of said method after the provision of the blank in the form shown in Fig. 2, i. e., the folding and sealing of said blank to form body 11, are adapted to be carried out by a novel body-making machine, one suitable form of which is illustrated in Figs. 7 to 13, inclusive.

In the form illustrated, said body-making machine comprises a frame structure consisting of a base 20 and a vertically extending cylindrical standard or support 21 to which are secured a pair of brackets 22 and 23 (Fig. 7). Common power means constituted by a fluid pressure operated motor 24 of the reciprocating piston, double-acting type pivotally mounted on base 20 are provided for actuating both the folding and sealing mechanisms of the machine. Fluid pressure within motor 24 is controlled by a manually operable rotary valve mechanism 25, the valve rotor being normally held by a spring 26 (Fig. 8) in position to admit fluid under pressure from a suitable source (not shown) through conduits 27 and 28 to the lower end of motor cylinder 24 and vent the upper end of said cylinder to atmosphere through conduits 29 and 30. When it is desired to effect a body-making operation, the operator depresses a pedal 31 from the dotted-line position to the full-line position shown in Fig. 7 against the efforts of spring 26, thereby actuating the valve rotor and reversing the pressure and air vent connections to motor cylinder 24 and causing the piston therein to move downwardly and, hence, pull piston rod 32 downwardly to the illustrated position.

The initial or first portion of the downward movement of piston rod 32 is operative through a yieldable driving connection, such as a friction clutch mechanism, to actuate novel folding means for wrapping blank 6 around mandrel 10. The latter, in the embodiment shown, is of rectangular cross-section and may be made of a light-weight material, such as duraluminum. Said mandrel is provided with a pair of longitudinally extending cylindrical bores 33 whereby the same is adapted to be slidably and removable mounted on a pair of supporting pins 34, 34 rigidly secured to bracket 23 (Figs. 9 and 10). Preferably, a spring-pressed ball 35 or the like is mounted in mandrel 10 and projects into one of the bores 33 for cooperation with a suitable notch or depression in one or the other of pins 34 (Fig. 9) to thereby properly position the mandrel on said pins with respect to the folding mechanism.

The novel means provided for folding blank 6 around mandrel 10 are mounted directly below the latter and comprise a casting 36, the upper surface of which is of substantially the same dimensions as one side 11a of body 11. Formed integrally with said casting and projecting downwardly therefrom is a centrally disposed, hollow, cylindrical portion 37 slidably receiving a vertical rod 38 which also slides in a bearing constituting a part of bracket 22. The upward movement of casting 36, 37 relative to rod 38 is limited by the enlarged upper end of the latter, said casting being normally held in limiting position (Fig. 9) by a spring 39 interposed between the lower end of said casting and a collar on said rod.

For clamping blank 6 against the lower face of mandrel 10 and folding the ends thereof upwardly, along the sides of the mandrel, a pair of upwardly extending, resilient blades or plates 40, having the upper edges thereof beaded, are rigidly secured to the long sides of casting 36, and a buffer plate 41 is mounted on said casting for yieldingly resisted movement relative thereto. Plate 41 has a pair of depending legs 42 which slidably extend into hollow bosses 43 which are formed integrally with and project downwardly from casting 36 (Fig. 10). Suitable resilient means, such as springs 44, are provided in bosses 43 for yieldingly holding plate 41 in raised position with the upper surface thereof slightly above the plane of the beaded edges of blades 40.

Novel means are also provided for effecting the folding of the ends of blank 6 across the upper surface of mandrel 10, said means, as shown, comprising a pair of diametrically disposed cams 45 and 46 secured to rod 38 and slidably extending through radial slots 47 cut in casting portion 37. Slidably and yieldably bearing against cams 45, 46 are rollers 48, 48 carried between a pair of spaced arms 49. The arms of each of said pairs are rigidly connected together by a plate portion 50 and are secured to a shaft 51 for pivotal movement therewith, said shaft being rotatably journalled in bearings 52 formed integrally with casting 36. Rollers 48 are normally held in yielding engagement with cams 45 and 46 by suitable springs 53 that are secured under tension to the ends of depending arms 54 which are mounted on shafts 51 at the ends thereof for rotation therewith. Secured to plate portions 50 by any suitable means, such as set screws, are folding blades 55 and 56, the upper ends of which are curved inwardly, as best seen in Fig. 9, for a purpose which will more fully appear in the description of the operation which follows.

To provide for the reciprocation of rod 38 and the folding means associated therewith, said rod is operatively connected to piston rod 32 through a friction clutch mechanism comprising a pair of plates 57 and 58 rotatably mounted on a shaft 59 projecting from bracket 22, said plates being held in frictional engagement with each other by a coil spring 60. Clutch plate 57 is provided with an arm 61, the outer bifurcated end of which straddles a pin 62 that projects radially from piston rod 32. A similar arm 63 is formed integrally with clutch plate 58 and cooperates with a pin 64 extending across the bifurcated lower end of rod 38. Thus, as piston rod 32 is moved downwardly by motor 24, rod 38 will be moved upwardly until the latter reaches the limit of its movement whereupon slippage between clutch plates 57, 58 occurs during continued downward movement of the piston rod.

During said continued downward movement of piston rod 32, the upper end thereof operatively engages a connecting pin 65 which extends between the adjacent ends of a pair of links 66 and 67 through an elongated slot 32a in said piston rod, to effect the operation of the sealing means to be next described, whereby the overlapping ends of the folded blank are heat-sealed to form longitudinal seam 10a. Link 66 is pivotally mounted on a shaft 66a, which extends between bifurcated portions of bracket 23, and link 67 is pivotally secured to the lower end of a crank arm 68 that is fixed to the central portion of a horizontal shaft 69 rotatably journalled in bracket 23. Secured to the outer end of shaft 69 for angular movement therewith are a pair of sector gears 70, 70 that mesh with a similar pair of gears 71, 71 which are, in turn, secured to the ends of a rotatable shaft 72 also journalled in bracket 23. On the central portion of shaft 72, there is mounted a crank arm 73, the outer bifurcated end of which straddles and is pivotally secured at 74 to an upwardly extending post 75 formed integrally with an elongated sealing element or iron 76.

In order to insure that the face of said sealing iron will simultaneously engage body 11 throughout its entire length, means are provided for maintaining the face thereof parallel to the upper surface of mandrel 10 at all times. This result is effected, in the illustrated embodiment, by including crank 73 and post 75 in a parallel motion linkage comprising a link 77 which is pivotally secured at 78 to the upper end of post 75 and at 79 to an upwardly extending portion 80 of bracket 23. Preferably, the lines connecting the center of pivots 72, 74, 78 and 79 form a parallelogram, but this is not necessary as long as the linkage is adjusted so that the face of sealing iron 76 and mandrel 10 are parallel when the former is in its contacting position. Sealing iron 76 may be heated by any suitable means, an electric heating element or calrod 81 being preferred. A thermostat control bulb 82 is mounted in iron 76 and connected to a thermostat which, in turn, controls an electric circuit including heating element 81 in a manner to appear hereafter (Fig. 35) for controlling the temperature of said sealing iron.

Means are provided in conjunction with sealing iron 76 for holding an end portion of blank 6 firmly against mandrel 10 during the sealing operation and, in the form shown, said means comprise an elongated pressure plate 83, best seen in Fig. 10, which is supported by a pin 84 that is mounted on a bar 85 and slidably extends through slightly elongated openings in a pair of ears 86 on said pressure plate. The elongation of said openings permits of some relative movement between plate 83 and bar 85, which movement is yieldingly resisted by a plurality of springs 87 interposed between the upper surface of said plate and a flange portion 88 on the lower end of said bar. The latter is pivotally supported by both of the pivots 74 and 78 whereby pressure plate 83 is caused to move in unison with sealing iron 76 and is maintained in parallel relation to the surface of mandrel 10.

As pointed out above, downward movement of piston rod 32, after the same engages pin 65, is effective through the above-described linkage and gearing to move sealing iron 76 and pressure plate 83 downwardly into operative engagement with mandrel 10 or the blank 6 wrapped around said mandrel. Upon upward movement of piston rod 32 from the position illustrated in Fig. 7, a spring 89 connected between pivots 66a and 68a is effective to buckle links 66 and 67 upwardly at pivot 65 and hence lift the sealing iron and associated elements to the position illustrated in Fig. 9.

The blank to be folded or wrapped about mandrel 10 to form a container body may be supported between said mandrel and buffer plate 51 by any suitable means, such as a pair of angular trays 90 and 91 which are sufficiently spaced from each other to permit folding blades 55 and 56 to move therebetween. As shown, tray 90 is secured to bracket 23 and tray 91 is mounted on a supporting rod 91a which is, in turn, adjustably supported by a countersunk portion 92 on bracket 23. Trays 90 and 91 serve both as supporting means and positioning means for the blank.

In the operation of the body-making machine above-described, mandrel 10 is first placed on pins 34 and a blank 6 is inserted in trays 90, 91, as seen in Fig. 9. The operator then depresses pedal 31 to admit pressure fluid to the upper end of motor cylinder 24 and thus effect a downward movement of piston rod 32. This movement is translated through clutch 57, 58 into upward movement of rod 38 and the folding mechanism associated therewith. Spring 39 is sufficiently stiff so that during the initial upward movement of rod 38, the entire folding mechanism moves in unison therewith, thus moving buffer plate 41 into engagement with blank 6, whereby the latter is yieldingly clamped against mandrel 10 by reason of the compression of springs 44, and moving resilient blades 40, 40 into engagement with the blank and upwardly along the sides of mandrel 10 to effect the upward folding of the ends of said blank (Fig. 11).

When casting 36, 37 reaches its limit of movement, i. e., when stop pins 93 engage buffer plate 41 and further upward movement of said casting is prevented by mandrel 10, rod 38 continues to move upwardly compressing springs 39 and lifting cams 45, 46 relative to rollers 48. As the latter ride out on the inclined surfaces of said cams, arms 49 are pivotally moved to carry the upper edges of folding blades 55, 56 into engagement with the vertically extending portions of blank 6 along lines slightly above the upper surface of mandrel 10 for folding the ends of said blank inwardly and downwardly against the mandrel (Fig. 12). The relative speed with which blades 55 and 56 move inwardly may be controlled by varying the slope of the operative faces of the cams. It will be seen that, in the present embodiment, cam 45 is so formed that blade 55 will complete its folding operation ahead of blade 56 to thereby insure the overlapping of the ends of blank 6 beneath sealing iron 76 in the desired manner.

At or about the time rod 38 reaches the limit of its movement in an upward direction and the ends of blank 6 have been folded inwardly, piston rod 32 begins to exert a downward pull on pin 65. Accordingly, upon continued downward movement of said piston rod, during which clutch plate 57 moves relative to plate 58, downward movement of pressure plate 83 and sealing iron 76 is effected through the linkage and gearing heretofore fully described, including cranks 68, 70 and 72, 73. Pressure plate 83 is the first to contact blank 6 and is effective through the action of springs 87 to yieldingly clamp the longer free end of said blank against the upper surface of mandrel 10. As said springs are being compressed, sealing iron 76 moves into engagement with the upper-most of the overlapping ends of blank 6. The heat from iron 76 and the pressure exerted thereby are effective to activate the lacquer coating between said overlapping ends and to press the same into the interstices of the engaging surfaces whereby the latter are substantially welded together and the impervious, longitudinal seam 10a is formed.

The operator then releases pedal 31 whereupon the rotor of valve 25 is shifted by spring 26 to a position whereby the lower end of motor cylinder 24 is connected to the source of fluid pressure and the upper end of said cylinder is connected to atmosphere. Piston rod 32 is thus moved upwardly by motor 24 and rod 38, together with the folding mechanism, is moved downwardly through the operation of friction clutch 57, 58. The initial movement of rod 38 is relative to casting 36, 37, due to the compression of spring 39, so that cams 45, 46 move downwardly relatively to rollers 48 and permit springs 53 to pull folding plates 55 and 56 away from mandrel 10 and accordingly free casting 36, 37 for downward movement.

As soon as piston rod 32 begins to move upwardly, spring 89 becomes effective to buckle links 66, 67 for lifting sealing iron 76 and pressure plate 83 in a manner heretofore pointed out. If desired, spring 89 may be comparatively small, in which event upward movement of the sealing iron will be effected by the upward movement of piston rod 32 after pin 65 is engaged by the lower end of slot 32a. It will be noted that, after the lower end of casting 36, 37 engages bracket 22, slippage will occur between clutch plates 57 and 58 during the remainder of the upward movement of piston rod 32.

*Top-sealing*

When body 11 has been thus formed and the sealing mechanism withdrawn in the manner above described, said body and mandrel 10 are manually removed from the body-making machine and transferred to a novel end-forming and -sealing apparatus illustrated in Figs. 14 to 23, inclusive, wherein one end, referred to as the top, of body 11 is folded and sealed, thereby completing container 51 to the stage illustrated in Fig. 3. In the illustrated embodiment of said end-sealing machine, the folding and sealing mechanisms are adapted to be actuated by common power means which may be controlled by rotary valve means. Said power and control means may be substantially the same as the corresponding means 24 and 25 illustrated in Fig. 7 and accordingly the showing thereof is not duplicated in Fig. 14. Standard 94 and piston rod 95 correspond to parts 21 and 32, respectively, of Fig. 7, and said standard has a casting or bracket 96 rigidly secured to the upper end thereof for supporting the novel folding and sealing mechanisms to be hereinafter described.

Said end-folding and -sealing apparatus is provided with suitable means for supporting mandrel 10 and body 11, said means, in the form shown, being constituted by a pair of pins 97 which are adapted to slidably project into bores 33 in the mandrel. In order to facilitate the insertion of the mandrel into said apparatus, pins 97 are slidably mounted in and project through bracket 96, the rear ends thereof being secured together by means of a bar 98 which engages bracket 96 to limit the forward movement of said pins, i. e., movement to the left, as viewed in Fig. 14. The rearward movement, i. e., movement to the right, as viewed in Fig. 14, of said pins is limited by a bar 99 which joins the outer ends of a pair of rods 100 that are rigidly secured to bracket 96 on opposite sides of pins 97. The latter are provided with suitable notches adjacent the forward ends thereof (Fig. 18) adapted to cooperate with spring-pressed ball 35 in mandrel 10 so that said supporting pins 97 will be pulled forwardly or outwardly each time a mandrel is removed therefrom.

When mandrel 10 and body 11 are received from the body-making machine, every portion of said body surrounds a part of the mandrel. Means are accordingly provided in the end-folding machine to slip or slide the body longitudinally of the mandrel to the position illustrated in Fig. 4, i. e., with hem 9 and a peripheral band portion A—B overhanging the end of the mandrel. Said means, as shown, comprise a pair of guide plates 101 which are mounted on bracket 95 by any suitable means, such as stud bolts 101a, in position to engage or nearly engage sides 11b of body 11. Said guide plates are provided with inwardly extending ribs 102 that extend into grooves 103 milled in the sides of mandrel 10 adjacent the inner end thereof (Fig. 1). Thus, as the operator places mandrel 10 on pins 97 and pushes the same inwardly or to the right, as viewed in Fig. 14, ribs 102 enter grooves 103 and engage the end edges of the side walls 11b of body 11. Movement of the latter is accordingly arrested as mandrel 10 is pushed therethrough and into engagement with bracket 96, the movement of said mandrel relative to body 11 being equal to one-half the width of the mandrel plus the width of hem 9.

The novel mechanisms of Fig. 14, provided for folding and sealing that portion of body 11 which overhangs mandrel 10, are adapted to be successively moved to operative and inoperative positions by the reciprocation of piston rod 95. As shown, the upper end of said piston rod is pivotally connected at 104 to the pivotally connected ends of a pair of links 105 and 106. Link 105 is pivotally mounted on a pin 107 extending between bifurcated portions of bracket 96 and link 106 is pivotally connected to the lower end of the depending arm 108 of a bell crank lever which also includes a horizontally extending arm 109. Lever 108, 109 is keyed or otherwise suitably secured to the central portion of a shaft 110 which is rotatably mounted in bearings formed in the upper bifurcated portion of bracket 96, the axis of said shaft being below pins 97. Fixedly mounted on the outer ends of shaft 110 are a pair of sector gears 111 which mesh with a similar pair of gears 112' secured to the ends of a second shaft 110' rotatably mounted in bracket 96 directly above shaft 110 and provided with a crank arm 109' corresponding to arm 109. Thus, as piston rod 95 is reciprocated by the fluid pressure motor, shafts 110, 110' are caused to rotate through predetermined angular distances in unison with each other but in opposite directions to thereby impart converging and diverging jaw-like action to arms 109 and 109'.

Novel means adapted to be controlled by the movements of arms 109, 109' are provided for folding the ends of body 11 to form end walls 12, ears 13 and tab 14, as shown in Fig. 3. Said means, in the illustrated embodiment, comprise two pairs of arms 113 and 113' which are loosely mounted at one end thereof on shafts 110 and 110', respectively, but are yieldingly connected thereto by pairs of coil springs 114 and 114' which surround shafts 110 and 110' and have the opposite ends thereof secured to arms 113, 113' and gears 111, 112, as best seen in Fig. 17. Springs 114, 114' tend to pivot arms 113, 113' toward each other, but, when the outer ends of the latter are not in contact, movement thereof relative to shafts 110, 110' by said springs is limited by pins or lugs 115, 115' which project laterally from crank arms 109, 109' and through elongated slots 116, 116' in arms 113, 113'. The outer end of each of the arms 113, 113' is provided with a bearing (Fig. 18) in which pairs of stub shafts or trunnions 117, 117' are rotatably supported. The trunnions of each of said pairs are connected together by, and support, folding members or blades 118 and 118', the latter being secured to said shafts in any suitable manner so that the blades will move angularly therewith and about substantially the same axes as the trunnions. Each of the shafts 117 has a sector gear 119 fixedly secured to the outer end thereof and adapted to mesh with a corresponding gear 119' fixed to the end of one of the shafts 117', when the parts are in operative position, as illustrated in Fig. 14.

Shafts 117 and 117' may thus be rotated in opposite directions to swing blades 118, 118' inwardly into contact with side walls 11a of body 11. When said blades have been swung through an angle of 90° from the position illustrated in Fig. 19, the same will have effected the folding of the overhanging marginal portion of the body to form end walls 12, ears 13 and tab 14, as seen in Fig. 23, said end walls being pressed against the end of mandrel 10 and ears 13 against laterally projecting ears 120 on guide plates 101. Movement of shafts 117, 117' and blades 118, 118' for the above purpose may be effected by exerting a force, in a manner and by means to be hereinafter fully described, on a fin 121 secured to the outer end of one of the shafts 117 and a similar fin 121' secured to the outer end of a shaft 117' at the upper side of the machine. Return movement of blades 118, 118' to the normal position illustrated in Fig. 18 after a folding operation may be effected by coil springs 122, 122' which surround shafts 117, 117' and have the opposite ends thereof secured to gears 119, 119' and arms 113, 113' respectively. The movement of the folding blades by said springs may be limited in a manner to hereinafter appear.

Means including heated sealing irons mounted on the outer ends of arms 109, 109' are provided for sealing and embossing tab 14 while the folds formed by the swinging movement of blades 118, 118' are positively held in folded position by said blades. As shown, the outer ends of said arms extend between the prongs of the bifurcated portions of a pair of sealing irons 123 and 123' (Fig. 15) which are loosely mounted on a pair of shafts 124 and 124', respectively, that extend through openings in the outer ends of crank arms 109, 109' and are fixed against rotation relative thereto. Irons 123, 123' are thus supported by the outer ends of said crank arms and are adapted for pivotal movement relative thereto. Upon the converging movement of arms 109, 109' effected by downward movement of piston rod 95, the operating faces of said sealing irons are adapted to engage opposite sides of tab 14 to apply heat and pressure thereto for imperviously sealing the engaging surfaces thereof together and thus form an impervious closure seam. Said operating faces are accordingly of substantially the same length as tab 14 and are provided with cooperating ribs and grooves (Fig. 21) for embossing said tab along lines 16 (Fig. 3). Irons 123, 123' may be heated by any suitable means, such as electric heating elements 125, 125' which are removably mounted in said irons adjacent the operating faces thereof. One or more thermostat control bulbs 126 may be provided in said sealing irons for controlling a thermostat which, in turn, is adapted to open and close a circuit including the heating elements, in a manner to be hereinafter described, for controlling the temperature of the sealing irons.

In order to insure a parallel relationship between the operating faces of irons 125 and 125' at all times and particularly when the same are in contact with tab 14, parallel motion means are provided by pivotally connecting the arms of the bifurcated portions of said irons at 127, 127' to the ends of two pairs of links 128, and 128' which are, in turn, pivotally connected to bracket 96 at 129 and 129', respectively. The axes of pivots 128 and 128' are so chosen that the lines connecting the centers of pivots 110, 124, 127 and 129, as well as those connecting the centers of pivots 110', 124', 127' and 129', will always form parallelograms. Accordingly, the operating faces of irons 123 and 123' will remain horizontal and parallel to each other at all times.

For the purpose of actuating blades 118, 118' of the folding mechanism above described, shafts 124 and 124' are extended in opposite directions from sealing irons 123 and 123' and have radially extending arms 130 and 130', respectively, rigidly secured thereto. Rollers 131 and 131' are provided on the outer ends of arms 130, 130' and are adapted to engage fins 121, 121'. Said arms accordingly limit the divergent angular movement of blades 118, 118' by springs 122, 122' and are effective to impart converging angular movement thereto during the relative movement of crank arms 109, 109' and arms 113, 113' permitted by slots 116, 116' after gears 119, 119' move into mesh.

In order to insure that mandrel 10 is properly and fully inserted between the jaws of the above-described machine so that the latter will not close thereon, novel electrical control means are provided whereby operation of the machine cannot take place until the mandrel is in a predetermined position therein. In the form shown, said control means comprise an electrical control switch mounted on bar 99 and including normally open contacts 132 and 133 (Fig. 14). Movable contact 133 is operatively connected to and insulated from a small rod 134 which slidably extends through bracket 96 between pins 97, and projects for a very short distance between guide plates 101 so as to be engaged by mandrel 10 when the latter is inserted against said bracket (Fig. 15). A spring 135 is provided for acting upon rod 134 to normally hold contacts 132, 133 in open position. Said contacts are accordingly moved to closed position only when mandrel 10 is inserted to its fullest extent (Fig. 18) to thereby move rod 134 and contact 133 in opposition to the efforts of spring 135 and, hence, close switch 132, 133.

Connected in circuit with contacts 132, 133 is the coil of a solenoid 136 which is mounted on a sleeve 137 that is operatively connected to the movable element of a fluid pressure motor (not shown) and adapted to slidably receive the lower end of rod 95. Pivotally mounted on sleeve 137 and operatively connected to the movable core of solenoid 136 is a bell crank 138, one arm of which is adapted to extend edgewise through a horizontal slot in said sleeve and into a registering groove in rod 95 when solenoid 136 is energized to thereby operatively connect said sleeve and rod. When switch 132, 133 is open and said solenoid is not energized, a spring 139 is adapted to pivot bell crank lever 138 to a position such that the latter is withdrawn from the above-mentioned slot in rod 95, thereby permitting sleeve 137 to move downwardly independently of said rod and accordingly prevent actuation of the machine. Accordingly, unless mandrel 10 is inserted in the machine a sufficient amount to engage rod 134 and, hence, close switch 132, 133, no operation of the machine can take place even though the fluid pressure actuated motor (not shown) is energized.

In the operation of the top-forming and -sealing machine, the operator takes mandrel 10 with body 11 thereon as received from the body-making machine and, with said top-forming machine in the open or inoperative position illustrated in Fig. 17, inserts said mandrel and body between guides 101 and onto pins 97 which have been pulled outwardly by the removal of the previous mandrel to a point at which bar 98 engages the rear of bracket 96. As the mandrel and body are moved rearwardly by pressure exerted on the outer end of the mandrel, said body engages ribs 102 and is arrested while the mandrel continues to slide therethrough and into engagement with pin 134 and bracket 96. It is only during the last small fraction of an inch of such movement that mandrel 10 engages pin 134 and effects the closure of switch 132, 133 to thereby complete the circuit to solenoid 136, assuming for the moment that no other control switches are provided in said circuit. Bell crank 138 is thus moved into the illustrated position (Fig. 16) for operatively connecting sleeve 137 and rod 95.

With the mandrel and body thus properly positioned, the operator depresses a pedal to actuate the control valve for energizing the power means (same as Fig. 7) so that piston rod 95, 137 will be pulled downwardly. This movement of said rod tends to align links 105, 106 and, hence, move arm 108 and shaft 110 in a clockwise direction, as viewed in the drawings. Through the medium of gears 111, 112, shaft 110' is moved simultaneously with shaft 110, but in a counterclockwise direction, thereby causing arms 113 and 113' to converge from the positions illustrated in Fig. 17. During the initial converging movement of arms 109, 109', the force exerted by pins 115, 115' on arms 113, 133' is released and the latter also converge under the influence of springs 114, 114' until gears 119, 119' move into mesh (Fig. 19), i. e. until the folding mechanism is in operative position.

During the continued converging movement of arms 109, 109', as permitted by slots 116, 116', folding blades 118, 118' are pivoted or swung inwardly through substantially 90° (Fig. 20) about the axes of trunnions 117, 117' as pivots by the force of arms 130, 130' against fins 121, 121'. The inward swinging movement of blades 118, 118' is effective to fold the overhanging marginal portion of body 11 in the manner heretofore fully pointed out. While said blades are in folding position, continued converging movement of arms 109, 109' brings sealing irons 123, 123' into engagement with opposite faces of tab 14 to thereby heat seal and emboss the same and thereby hermetically close the top of container 15 (Fig. 21). The operator then releases the control pedal whereupon the power actuator is energized to push rod 95, 137 upwardly and return the parts to the open inoperative position illustrated in Fig. 17. During said opening movement, arms 113, 113' remain stationary until pins 115, 115' reach the outer ends of slots 116, 116' at which time sealing irons 123, 123' are clear of blades 118, 118'.

Plowing tabs

Novel means, which are preferably installed adjacent the top-sealing apparatus just described, are provided for folding tab 14 and tabs or ears 13 formed in said apparatus down against the walls of the container (Fig. 3). Said means, in the illustrated embodiment, comprises a plow (Figs. 24 to 26) having a vertically extending portion 141 with a portion 142 at the upper end thereof bent at an angle thereto and having a width substantially equal to the length of tab 14. The outer ends of portion 142 are merged or connected with side walls 143, which extend at right angles to portion 141, by a curved, somewhat helicoidal surface 144 (Fig. 26).

After body 11, with the top thereof formed and sealed, is removed with mandrel 10 from the top-sealing machine, the same is inserted in the above-described folding plow with one portion of end wall 12 engaging the vertical portion or wall 141 of the plow. Upon downward linear movement of the body and mandrel from the lower position illustrated in Fig. 14, tab 14 is folded flat against the other portion of end wall 12 by angular portion 142 and the outer ends of said tab, together with ears 13, are folded by engagement with helical surfaces 144 and side walls 143 into contact with walls 11b of the container (Fig. 4).

Filling and packing

Container 15, being thus completed to the stage illustrated in Fig. 4, is removed from mandrel 10 and inserted in chuck 17 for filling and closing (Figs. 27 and 28). Said chuck, in the form illustrated, comprises a block 145 on which are mounted a pair of U-shaped jaw members 146, adapted to form a pocket for receiving container 15. One of the members 146 is preferably pivotally secured to said block at 147 to thereby permit opening of the chuck and facilitate the insertion and removal of the container. Members 146 ar normally held in closed position by a tension spring 148 and are each provided with a recess 149 in the inner wall thereof for accommodating the folded ears 13, 13 adjacent the top of the container. The length of members 146 above block 145 is preferably substantially equal to the desired length of the finished container (Fig. 6) so that a marginal portion of the unfilled container at the open end thereof projects beyond said members. For purposes to appear hereinafter, jaw members 146 have grooved ears 150 extending laterally from the sides thereof and block 145 has a pair of longitudinally extending bores 151 therein.

After a measured quantity of tobacco 18 or other product to be packaged has been placed in container 15 through any suitable means, such as a funnel 152, packing strip 19, which constitutes in effect a temporary or secondary closure, is inserted against the surface of the tobacco by a suitable packing plunger (not shown) whereby the tobacco is packed to the position illustrated in Fig. 28 without contaminating the operating face of the plunger with tobacco.

Bottom forming and sealing

Chuck 17, with the filled container supported therein, is next transferred to a bottom-folding and -sealing machine whereby the marginal portion of body 11 which extends beyond the upper end of the chuck and secondary closure 19 is folded and sealed in the same manner in which the top of the container was closed to thereby form end wall 12', 12', ears 13', 13' and tab 14' (Fig. 5). Said bottom-folding and -sealing machine (Figs. 29 to 31) is identical in many respects with the top-folding and -sealing machine above described, the chief difference in the two being merely that the folding and sealing mechanisms thereof are mounted on their supports at right angles with respect to each other. The jaws of the top sealer extend horizontally while those of the bottom sealer extend vertically in order to prevent spilling of tobacco 18 therefrom during the folding operation. Accordingly, the structure and operation of the bottom closing machine of Figs. 29 to 31, inclusive, will not be described in detail, but parts thereof which are similar, except as to the position in which the same are mounted, to parts of the machine of Fig. 14 will be designated by the same reference numerals as said similar parts.

As above pointed out, the folding and sealing mechanisms of the bottom sealing machine extend vertically, as distinguished from horizontally, i. e., arms 109, 109' and 113, 113' extend vertically from their supporting shafts 110, 110' which are rotatably mounted with their axes in the same horizontal plane on a bracket 153 rigidly secured to the upper end of standard 94. Arm 108 which extends horizontally in Fig. 29 is operatively connected to piston rod 95, 137 by a link 154 and a bell crank 155 pivotally mounted on bracket 153. It will be understood that the power means for actuating piston rod 95, 137 and the control means for said power means are similar to or identical with those shown in Fig. 7.

For positioning chuck 17 in the bottom sealer, the latter is provided with a pair of upwardly projecting pins 97 which are rigidly secured to bracket 153 between shafts 110, 110' and adapted to slidably extend into bores 151 of said chuck (Fig. 31). The safety mechanism of Fig. 16 is also employed on the bottom sealer so that the latter cannot be rendered operative unless chuck 17 is in its proper position, i. e., down against bracket 153 and, hence, pushing rod 134 downwardly to close switch 132, 133 (Fig. 30).

When the operator depresses the control pedal and thereby energizes the power means, rod 95, 137 moves downwardly thereby causing arms 113, 113' to move gears 119, 119' into engagement and causing arms 109, 109' and 130, 130' to swing the folding plates inwardly to form end wall 12', ears 13' and tab 14' in the manner heretofore fully described. During this folding operation, strip 19 serves as an internal support for maintaining the outline of the end of the package and for preventing any crushing of the contents thereof. Downward movement of rod 95, 137 also moves irons 123, 123' into engagement with tab 14' to imperviously heat-seal the same, thereby hermetically sealing tobacco 18 within container 15. Upward movement of piston rod 95, 137 for moving the parts to open position (Fig. 31), after the sealing of tab 14' is completed, is effected by releasing the control pedal to reverse the operation of the power actuator in the manner heretofore fully described.

Plowing bottom tabs

Container 15 having been thus imperviously sealed and completed to the stage illustrated in Fig. 5 is next subjected to the action of a second plow (Figs. 32 and 33) whereby tab 14' and tabs or ears 13' are folded down against the bottom end of the container, as shown in Fig. 6, by a single linear movement of the chuck and container.

The plowing mechanism, as illustrated, is mounted on a support 156 and comprises a substantially flat back portion 158 and side portions 159 which terminate in tracks or guides 160 adapted to slidably extend into the grooves in ears 150 on chuck 17. Offset from the plane of said back portion in the direction of tracks 160 and connected thereto by a narrow supporting portion 161 is a folding plate 162, the upper end 163 of which extends laterally in both directions and is bent rearwardly through a small angle. The rear surfaces 164 of tracks 160 at the upper pointed ends of the latter are in a plane parallel to but spaced a short distance from the plane of the forward surface of folding plate 162. Rear surfaces 164 of said tracks are merged or connected with the forward or inner flat surface 166 of back portion 158 by a curved or helicoidal surface 167.

Pivotally mounted on support 156 below the plowing mechanism is a bell crank 168, one end of which has an extension 169 projecting upwardly through the upper surface of said support. The other end of said crank has a sealing iron 170 secured thereto so that the heated end thereof extends through an opening in back portion 158 of the plow. Said sealing iron may be electrically heated by a calrod 171 and the temperature of said iron may be controlled by a thermostat connected in circuit with said calrod and to a thermostat control bulb 172.

Thus, when the grooved ears 150 of chuck 17 are engaged by tracks 160 and said chuck is pushed downwardly (Fig. 33), the pointed or narrowed upper ends of said tracks ride into grooves 150a beneath ears 13', and that tab 14' is folded upwardly against end wall 12' by folding plate 162, 163. Ears 13', together with the projecting ends of tab 14', are then first folded by curved surfaces 167 into a plane parallel with sides 11b of the container, thence inwardly between back portion 158 and the bottom corners of plate 162 and down against the end wall of the container. During the last portion of the downward movement of chuck 17 in plow mechanism, the same engages pin 169 and is effective to pivot bell crank 168 in a clockwise direction, as viewed in Fig. 33. The operative face of sealing iron 170 is thus pressed against the inner ends of ears 13' for heat-sealing said ears in folded position. The lacquer coating on foil lamina 8 serves as the tacking or binding medium.

As heretofore pointed out, the electrical heating element 81 of the body-making machine (Fig. 7) is electrically connected in a circuit controlled by a thermostat which is, in turn, operatively connected to thermostat bulb 82 whereby the temperature of sealing iron 76 may be automatically controlled. One suitable form of circuit for this purpose is diagrammatically illustrated in Fig. 35 as comprising an extension cord 173 which is adapted to be plugged into the local source of current supply (not shown) and into a socket 174 mounted on the machine. The leads from socket 174 are connected to a manually operable master switch 175 and said switch is, in turn, connected to a pair of fuses 176. Heating element 81 is connected across the terminals of said fuses through a plug and socket arrangement diagrammatically shown at 177 and a switch 178 adapted to be opened and closed by a thermostat 179 which is, in turn, controlled by fluid filled bulb 82 mounted in the sealing iron adjacent heater 82, said thermostat and bulb being connected by a fluid conduit 180. Additional plugs 177', may be provided in parallel with plug 177 for connecting additional heating elements or the like, and a small signal light 181 may be connected in circuit with said plugs for indicating when switch 178 is closed and heater 81 is energized. A second bulb 182 may be connected across the fuse terminals to indicate when master switch 175 is in closed position.

Figure 32:
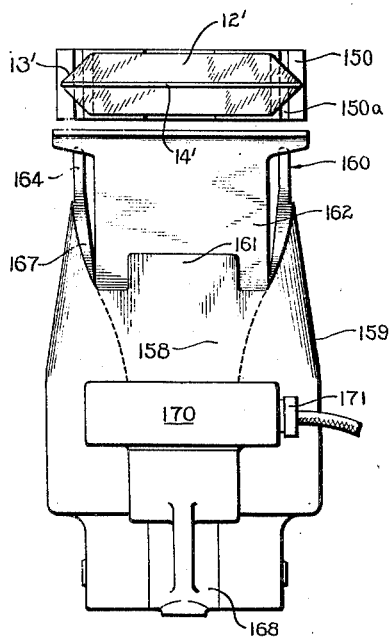
Fig. 32 is a rear elevation of another form of plow for folding and tacking the tabs formed during the end folding and sealing operation.
Figure 33:
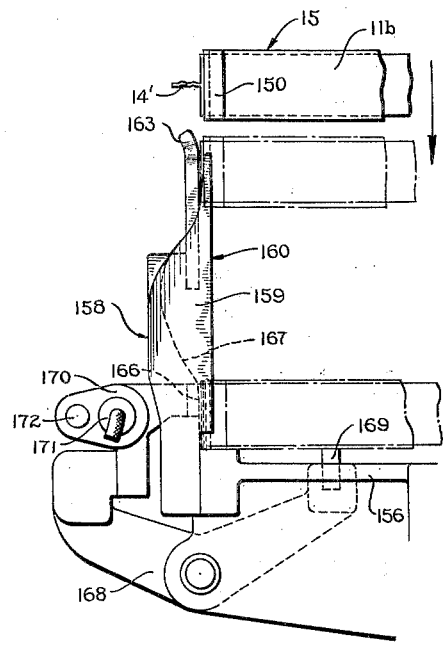
Fig. 33 is a side elevation view of said plow.
Figure 34:
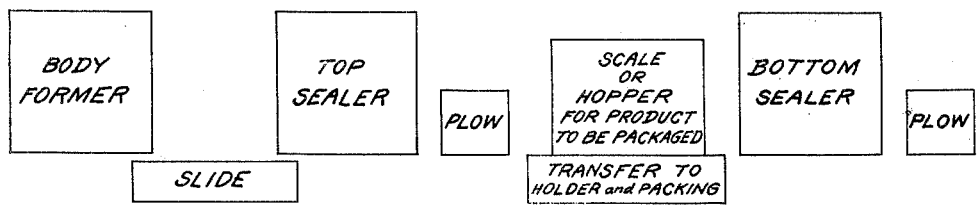
Fig. 34 is a diagram illustrating the progress of the container through the means for carrying out the novel method of the invention.

The electrical circuit diagrammatically shown in Fig. 36 for controlling the temperature of heating elements 125, 125' in each of the end sealing machines of Figs. 14 and 29 is identical with the circuit above described and like parts are accordingly designated by the same reference numerals. It will be noted that the additional heating element 125' is plugged in at one of the sockets 177'. Since the plow of Fig. 32 is preferably mounted adjacent the bottom sealing machine (Fig. 29), heating element 171 thereof may also be plugged in at one of the sockets 177'.

For controlling the safety mechanism (Fig. 16) installed on the end-sealing machines and heretofore fully described, and for insuring the safety of the persons operating said machines, additions are made to the circuit of Fig. 36. As shown, the primary of a transformer 183 which is adapted to materially reduce the line voltage, is connected directly across the terminals of fuses 176 and the coil of solenoid 136 is connected across said terminals through a normally open magnetically operated switch 184. The latter is adapted to be closed by a solenoid 185, the coil of which is connected in series with the secondary of transformer 183, mandrel- or chuck-operated switch 132, 133 and a pair of push button switches 186 and 187, the latter of which are positioned for operation by the operator's two hands. Accordingly, no current will flow in solenoid 185, and, hence, switch 184 will remain open, unless switch 132, 133 and switches 186 and 187 are all simultaneously closed. It will be seen, therefore, that solenoid 136 will be energized to render the end-sealing machines operative only when mandrel 10 or chuck 17, as the case may be, are properly positioned therein and when the operator's hands are on switches 186 and 187 and, hence, clear of the closing jaws of the machines.

There is thus provided novel method for making containers and packaging products whereby the latter may be hermetically enclosed in inexpensive materials in an efficient and inexpensive manner with the aid of simply constructed, power operated machinery. Novel apparatus adapted for use in carrying out said method is also provided. Said apparatus includes novelly constructed machines for making tubular container bodies, for forming end closures on said bodies and sealing the same, and for folding the projecting portions of the closure folds down against the walls of the container. Novel means and method are particularly provided for folding a marginal portion of an open-ended container body to form an end wall and a closure seam which may be sealed by the application of heat and pressure without exerting any of said pressure against the contents of the container.

Although only a single embodiment of the invention is illustrated and described in detail, it is to be expressly understood that the same is not limited thereto but that various changes

What is claimed is:

1. The method of forming a container which comprises wrapping a blank around a form, sealing the overlapping ends of the blank to form a body, supporting said body on said form while subjecting a peripheral end portion thereof to the action of angularly moving folding members for folding portions of two opposed side walls thereof inwardly through an angle of 90° to form an end wall and moving opposed halves of the inner peripheral surface of the margin at said end of the body into engagement, applying heat to said margin to activate a thermoplastic adhesive therebetween, and supporting said container externally while sealing the open end thereof in the same manner as the first end.

2. Apparatus for making containers comprising a mandrel, a folding unit comprising means for holding a portion of a blank against one side of said mandrel, linearly movable means for simultaneously folding portions of the projecting ends of said blank into engagement with opposed sides of said mandrel and angularly movable members for folding the ends of said blank into engagement with the other side of said mandrel and into overlapping relation with each other, a sealing unit for applying heat and pressure to said overlapping ends, and common power means for successively moving said folding and sealing units to operative position.

3. In apparatus for making containers from foldable material, means for folding said material, means for sealing engaging surfaces of said material together comprising a heating element, means for heating said element and parallel motion mechanism supporting said element in substantial parallelism to said engaging surfaces, and common power means for successively moving said folding and sealing means to operative position.

4. In apparatus for making containers, means for supporting the material for making a container, means for holding adjacent surfaces of said material in engagement with each other, means for applying heat and pressure to said engaging surfaces comprising a heating element, means for heating said element and parallel motion mechanism for supporting said element in substantial parallelism with said engaging surface, and means for moving said element to and from operative position.

5. In apparatus for making containers, means for supporting an open-ended container, a pair of pivotally mounted folding members disposed on opposite sides of said container and means for simultaneously pivoting said members against opposed side walls of said container to form a two-part end wall and a tab having opposed halves of a peripheral marginal portion of said container in engagement, means for applying heat and pressure to said tab, and common power means for successively moving said folding members and said heat-applying means into operative position.

6. In apparatus of the class described, a support, a mandrel removably mounted on said support, folding mechanism operatively associated with said mandrel, pneumatic means for actuating said folding means, and manually operable means for controlling said pneumatic means.

7. In apparatus of the class described, a support, mandrel positioning means carried by said support, a removable mandrel adapted for mounting on said means, heat sealing means for forming the seams of a container mounted on said mandrel, power means for actuating said sealing means, and means for controlling said power means whereby the latter is rendered operable only when said mandrel is in a predetermined position.

8. In the container making art, the method which includes making an open-ended container body from a blank and engaging each half of the surface of the container top with a folding member, and swinging said half surface and member about the upper edge of said body as a pivot axis.

9. In the container making art, the method which includes making a tubular container body of foldable material, engaging portions of opposite sides of said body with folding members, and swinging each of said members and the portion engaged thereby about substantially the same axis to form an end wall of the container.

10. In the container making art, the method which includes making a tubular container body of foldable material, engaging portions of opposite sides of said body with folding members, and simultaneously swinging said members and portions inwardly about the end edges of the container as axes to form an end wall of the container.

11. In the container making art, the method which includes making an open-ended container body of foldable material, engaging portions of opposite sides of said body with folding members, and swinging said members and portions inwardly without appreciable relative sliding movement between said members and portions to form an end wall of the container.

12. Apparatus for closing a container body to form a container comprising means for supporting the body, a pair of folding members adjacent opposite sides of said body, means for pivotally supporting said members for movement about axes extending parallel to and adjacent said sides intermediate the ends of said body, and means for simultaneously moving said members in converging directions about said axes to fold portions of said sides to form an end wall of said container and a tab with opposed halves of the inner peripheral surface of a marginal portion of said body in engagement.

13. Apparatus for closing a container body to form a container comprising means for supporting said body, a pair of folding members having flat surfaces adapted to engage portions of opposed sides of said body, means for pivotally supporting said members for angular movement about axes extending parallel to and adjacent said portions, and means for angularly moving said members about said axes to engage and fold said portions inwardly to form an end wall of said container.

14. Apparatus for closing a container body to form a container comprising means for supporting said body, a pair of angularly movable folding members adjacent opposite sides of said body, means for pivotally supporting said members for movement about axes adjacent said sides, means for angularly moving said members in converging directions to fold portions of said sides inwardly to form an end wall of said container substantially in the plane of said axes and a tab with opposed halves of the inner peripheral surface of a marginal portion of said body in engagement, and means for applying heat and pressure to said tab.

15. Apparatus for closing a container body to form a container comprising means for supporting said body, a pair of blade-like folding elements, means supporting said elements for pivotal movement about axes extending parallel to and adjacent opposite sides of said body intermediate the ends thereof, and means for moving said members in converging directions about said axes and toward said sides to engage and fold portions of the latter to form an end wall of the container substantially in the plane of said axes.

16. Apparatus for closing a container body to form a container comprising means including a rigid form for supporting the body, a pair of folding members, means supporting said members for pivotal movement about axes adjacent opposite sides of said form at one end of the latter, and means for angularly moving said members about said axes and against portions of said body projecting beyond the end of said form for folding said portions in converging directions to form an end wall of the container.

17. Apparatus for closing a container body to form a container comprising means for supporting said body, a pair of folding members, means supporting said members for pivotal movement about parallel axes, and mechanism operable in a jaw-like manner for successively moving said members into operative position with said axes adjacent opposite sides of said body and moving said members angularly about said axes toward said sides to engage and fold portions of the latter to form an end wall of the container in substantially the same plane as said axes.

GEORGE ARLINGTON MOORE.